United States Patent [19]

Caine

[11] Patent Number: 5,361,078

[45] Date of Patent: Nov. 1, 1994

[54] MULTIPLE SCREEN GRAPHICS DISPLAY

[75] Inventor: Lester S. Caine, Broadway, United Kingdom

[73] Assignee: Nadimelia Limited, Limassol, Cyprus

[21] Appl. No.: 917,020

[22] PCT Filed: Nov. 9, 1990

[86] PCT No.: PCT/GB90/01729

§ 371 Date: Nov. 12, 1992

§ 102(e) Date: Nov. 12, 1992

[87] PCT Pub. No.: WO91/13518

PCT Pub. Date: Sep. 5, 1991

[30] Foreign Application Priority Data

Feb. 16, 1990 [GB] United Kingdom ................ 9003599
May 8, 1990 [GB] United Kingdom ................ 9010287

[51] Int. Cl.⁵ ............................................. G09G 5/12
[52] U.S. Cl. ............................................. 345/1; 345/2
[58] Field of Search ................ 340/717; 345/1, 2, 903

[56] References Cited

U.S. PATENT DOCUMENTS

| 3,961,324 | 6/1976 | Cousin et al. ............... 340/717 |
| 4,057,849 | 11/1977 | Ying et al. . |
| 4,704,697 | 11/1987 | Kiremidjian et al. ............... 340/717 |
| 4,760,388 | 7/1988 | Tatsumi et al. ............... 340/717 |
| 4,761,641 | 8/1988 | Schreiber ............... 340/717 |
| 4,800,376 | 1/1989 | Suga et al. ............... 340/717 |
| 4,866,530 | 9/1989 | Kalua . |
| 4,884,068 | 11/1989 | Matheny et al. ............... 340/717 |
| 4,965,559 | 10/1990 | Dye ............... 340/717 |

FOREIGN PATENT DOCUMENTS

| 0074696 | 3/1985 | European Pat. Off. . |
| 0222920 | 5/1987 | European Pat. Off. . |
| 230241 | 7/1987 | European Pat. Off. . |
| 250123 | 12/1987 | European Pat. Off. . |
| 331847 | 9/1989 | European Pat. Off. . |
| 351825 | 1/1990 | European Pat. Off. . |
| 376332 | 7/1990 | European Pat. Off. . |
| 1193546 | 6/1970 | United Kingdom . |
| 1304473 | 1/1973 | United Kingdom . |
| 1326103 | 8/1973 | United Kingdom . |
| 1353131 | 5/1974 | United Kingdom . |
| 1370852 | 10/1974 | United Kingdom . |
| 1470785 | 4/1977 | United Kingdom . |
| 1486678 | 9/1977 | United Kingdom . |
| 2100098 | 5/1981 | United Kingdom . |
| 2123656 | 2/1984 | United Kingdom . |
| 2148007 | 5/1985 | United Kingdom . |
| 2205470 | 8/1990 | United Kingdom . |
| WO88/00751 | 1/1988 | WIPO . |
| WO88/10052 | 12/1988 | WIPO . |

Primary Examiner—Jeffery Brier
Attorney, Agent, or Firm—Andrus, Sceales, Starke & Sawall

[57] ABSTRACT

A display system comprises a wall of video screens each driven by a respective video driver (24A–24D). Information to be displayed is supplied from a host computer (10) having conventional input/output devices (12,14). Each circuit board of the host computer serves a number of video channels and supplies the information to be displayed on each screen to an associated portion of random access memory (22A to 22E). Thus, each screen displays a portion of an image or the whole image when the video drivers read out data in parallel from the portions of memory (22A to 22E). The information displayed may be altered via the input devices (12, 14) to the host computer (10).

4 Claims, 2 Drawing Sheets

MULTIPLE SCREEN GRAPHICS DISPLAY

FIELD OF THE INVENTION

The present invention relates to a display system capable of displaying images on a plurality of screens. For the purposes of this application, "screen" is used as a convenient expression to denote an image display device of any kind, whether a cathode ray tube device or not. The invention is concerned more particularly with a multi-screen display system of a kind useful for announcement, advertising and other purposes.

BACKGROUND OF THE INVENTION

It is already known, using mixing deck techniques, to distribute video signals to multiple screens, including screens arranged in a so-called video wall, i.e. an array of screens stacked side-by-side and one above the other. In this case the images may be independent or related, so as to make up a larger image with portions on the individual screens. Existing video wall systems are video based and have the disadvantage that information or pictures to be displayed has to be pre-recorded. This limits the use of video walls considerably. Moreover, as the cost of making videos is very high, it is not commercially viable to record all the information that it would be desirable to be able to display on a video wall.

OBJECT OF THE INVENTION

The object of the present invention is to provide a relatively inexpensive system which will nevertheless give great flexibility in controlling what is displayed on the screens.

SUMMARY OF THE INVENTION

The invention is defined in the appended claims.

The invention, in a preferred embodiment has the advantage that it reduces greatly the cost of displaying information via a video wall. The cost of generating graphics and text by computer is very small compared to the costs of filming video. This increases greatly the flexibility of video walls.

Moreover, the use of a computer to generate graphics and text has the advantage that information to be displayed can be updated easily. This means that a video wall may be used, for example, as a departure or arrival indicator in an airport, station or the like. In this manner the invention solves a long standing problem encountered in this field which is that of providing a low cost updatable display which can be read, easily, by passengers or customers. Heretofore, single video monitors have been used which are difficult to read from a distance and can only display a limited amount of information.

A preferred embodiment of the invention solves this problem by using a video wall of, for example, four or six screens which display the same information as the prior art single screen but enlarged over the whole wall. This greatly increases the readability of the monitor. Moreover, as the system is graphics based, additional information can be displayed such as airline logos or customer information.

The invention has the further advantage that the information can be updated from a remote location, for example from a central control station so that the information being displayed can easily be checked.

Update of information displayed can be performed remotely by computer on a pre-programmed basis or can be, for example, by a datacast signal sent to a number of locations. This facility enables a system embodying the invention to be used for advertising, for example in large stores, supermarkets, banks etc. The necessity to provide a pre-filmed video to each display location is removed.

BRIEF DESCRIPTION OF THE DRAWINGS

Embodiments of the invention will now be described by way of example with reference to the accompanying drawings, in which.

DESCRIPTION OF PREFERRED EMBODIMENT

Figure 1:
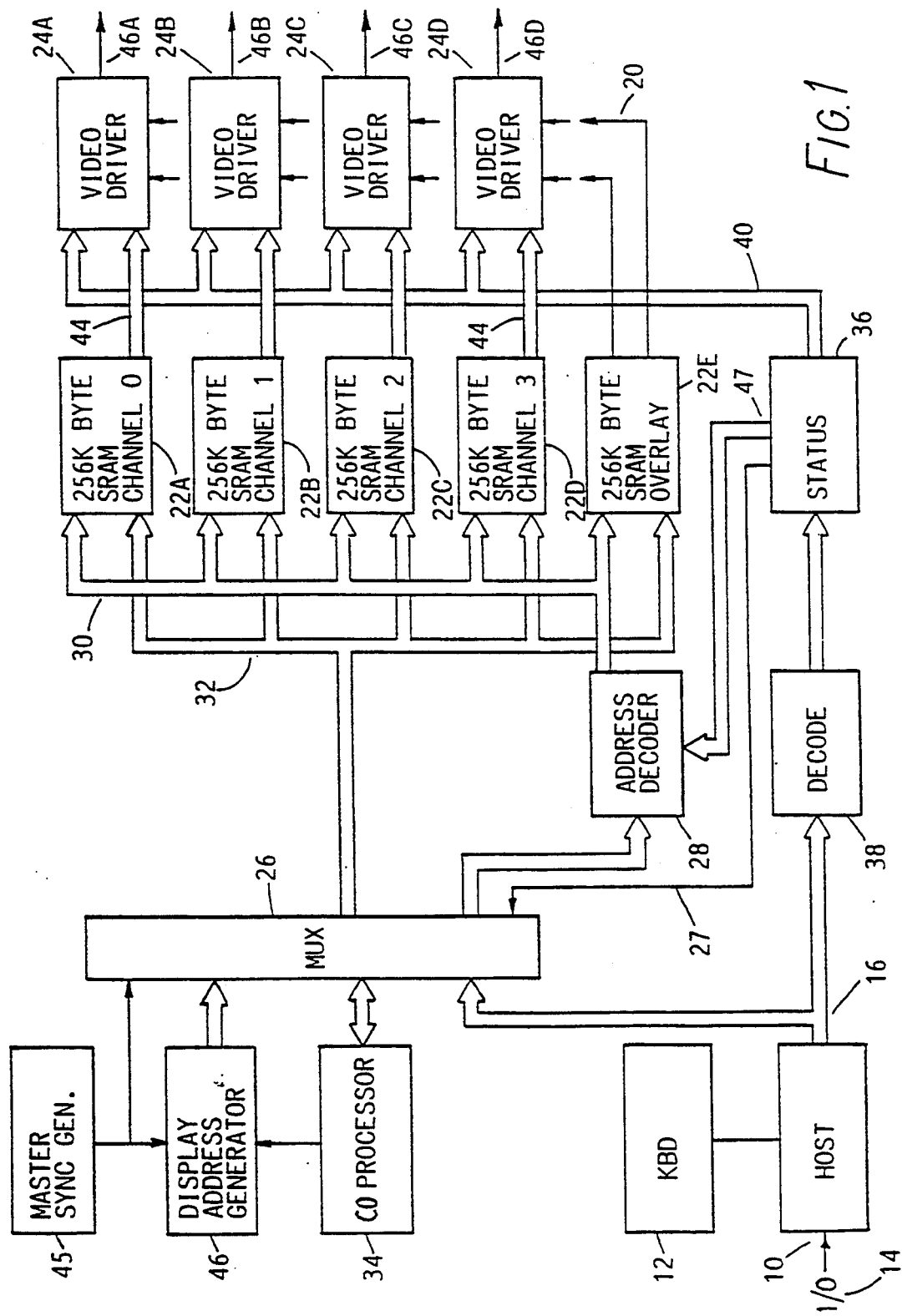
FIG. 1 is a block circuit diagram of a processor board.

FIG. 1 shows a host computer 10 which may be an AT computer for example with its own internal memory and hard and floppy disc drives, not separately shown. If interactive operation is required the computer is equipped with a keyboard 12 and/or another manual input device, such as a mouse or a tablet. Provision may be made for input from other sources, as symbolized by an I/O connection 14.

The remainder of the circuit diagram represents the components on one circuit board plugged into a slot of the host computer and accordingly communicating with the computer by way of the computer bus 16, namely a conventional AT bus in the use of any particular computer bus but the bus 16 will include data lines, address lines and various control lines, as is well known. There may be 16 data lines in the bus 16.

Figure 3:
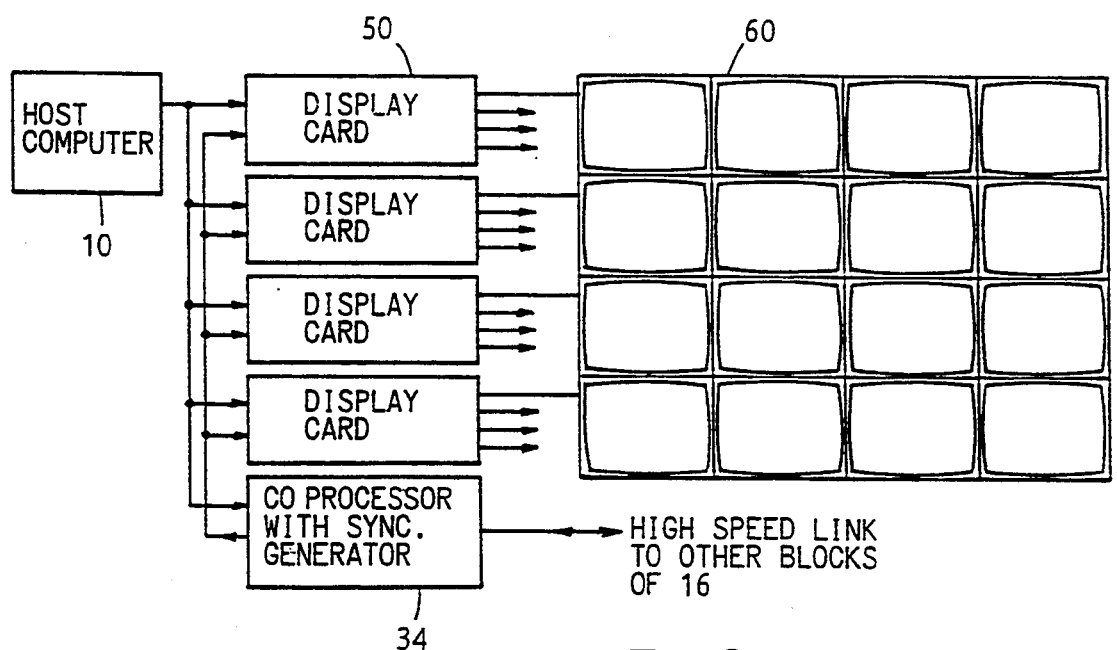
FIG. 3 is a similar diagram to FIG. 2 showing how the system may be expanded into blocks of sixteen monitors.

The illustrated board serves four video channels. In a typical set up in which the host computer 10 has a total of eight slots there may be capacity for six boards such as the one illustrated, providing accordingly for 24 video channels. It is assumed that two slots are occupied conventionally by an input/output board and a hard disc controller. The invention is not in any way limited to the number of boards used not the number of video channels per board. Additional computers may be linked via the co-processor as shown in FIG. 3.

In the illustrated embodiment the four video channels are served by a total of 1.2 Mbytes of static RAM (SRAM) 20, treated functionally as five 256 Kbyte slots 22A to 22E. The illustrated representation of five SRAMs is unlikely to correspond to the physical arrangement. The four SRAMs 22A to 22D are assigned to four video channels and connected to four corresponding video drivers 24A to 24D. Provision is made for additional address lines to be added to allow a larger memory block, allowing additional pages and colours but increasing cost. The SRAM 22E carries text overlays images, as will be explained in more detail below. It is to be understood that the term image is to be interpreted as including both picture information and textual information or any combination of the two. Thus, text displaced on a blank or single colour background is an image.

The host computer 10 can access the memory 20 via the bus 16, a multiplexer 26, an address decoder 28 and address and data buses 30, 32. The multiplexer 26 is provided to enable an optional co-processor 34 to handle the manipulation of image data in the SRAMs. The multiplexer 26 is controlled by one bit of a status register 36, which is a write only register in the computer I/O address space, e.g. address 300 (HEX), served by a decoder 38 connected to the bus 16 upstream of the multiplexer 26.

The status register 36 also holds two bits, described below, which are fed to the video drivers 24A to 24D on a bus 40. Each video driver is shown as communicating with its corresponding 256 Mbyte SRAM via a data bus 44. The video drivers are commercially available integrated circuits which read out video information pixel by pixel and generate video output signals on lines 46A to 46D. The pixel data on the buses 44 is only eight bits wide, allowing for generation of 256 different colours only but the video drivers 24A to 24D include colour look up tables whereby the 256 colours can be selected from a pallette of 16,777,216 with output resolution of eight bits on each of the red, green and blue outputs. There is provision to expand the pixel bus 44 to 16 bits, reducing the number of colours to 65536 but permitting full direct control of the image display. The display is limited to 384 pixels by 288 lines (non-interlaced 625 lines television). Although this is a limited resolution, the generation of signals in RGB presents a much better picture quality than that created by a normal television signal. Moreover, this resolution is available on each screen making up the wall, independently of the number of screens.

The overlay SRAM 22E is shown as driven synchronously with the driver 24D; in fact all the SRAMs are driven synchronously and it is necessary to use only a single address counter mechanism for this purpose. The overlay SRAM 22E provides two bits to each of the drivers 24A to 24D to overlay text information. If the two bits are 00 the overlay is transparent. The other three values select a fixed colour. Two of the bits from the status register 36 on the bus 40 select the overlay colour set which is employed by the video drivers 24A to 24B. The expansion of the overlay memory to 16 bits allows direct control of each overlay area with the status register allowing additional effects to be controlled.

To enable computer and driver accesses to the memory 20 to take place without conflict, the well known technique is employed of assigning computer accesses to one half of a clock cycle and the video driver accesses to the other half, i.e. the accesses are time-multiplexed. The way in which memory is utilized in the extended address space of the AT host computer 10 will not be explained. Each board is mapped into a 2Mbyte slot defined by corresponding bit switches on the board. A maximum of six boards is envisaged and the allocation of 2Mbyte address ranges is as follows:

| Board No. | Address Range |
| --- | --- |
| 0 | 200000–3fffff |
| 1 | 400000–5fffff |
| 2 | 600000–7fffff |
| 3 | 800000–9fffff |
| 4 | a00000–bfffff |
| 5 | c00000–dfffff |

The allocation of memory on one board, such as that in the drawing, will now be explained, taking board 0 by way of example. The allocation of address space for this board is as follows:

| Channel | Address Range |
| --- | --- |
| 0 | 200000–23ffff |
| 1 | 240000–27ffff |
| 2 | 280000–2bffff |
| 3 | 2c0000–2fffff |
| OVERLAY | 300000–33ffff |
| PALLETTE | 340000–37ffff |

The image storage is thus assigned as 256Kbyte per channel which is divided into two images occupying 128Kbyte each, referred to as page 0 and page 1 respectively. The expanded system uses the whole of a 256 Kbyte block for each page. One page can be displayed while the other is updated in the background with a switch of pages for dramatic effect. The page selected for display is determined by the status register 36 with additional bits used for memory expansion.

Accordingly the effective bits in the status register 36 are:

(1) 2 bits to select overlay colour set or effect
(2) 2 bits to select page 0 to 3 (if fitted) for display
(3) 2 bits to select page 0 to 3 (if fitted) for update
(4) 1 bit to select the host computer or the coprocessor at the multiplixer.

The two bits (1) are the bits in the bus 40. The four bits (2) and (3) modify the address decoder 28 via bus 47. The bit of (4) is the bit on line 27 to the multiplexer 26. Line 27 extends as an output from the status register 365 to the multiplexer 26. Each image store of 128 Kbytes (or 256 Kbyte) holds 341 lines of 384 pixels each starting at address 0 of the page. Lines 289 to 341 are not displayed but may be used to store extra information.

Since an AT computer operates with 16 bit words it is convenient for all accesses to the memory 20 to be by 16 bit words, which means that so far as the basic unit is concerned, pixels are accessed in pairs of adjacent pixels.

The invention is not concerned with the details of image creation. Creation of images by various techniques such as "painting", frame grabbing and so on are well known and so is the manipulation of existing images. For the purposes of the present invention it is sufficient to state that the host computer 10 controls the writing of image and overlay data into the memory 20, delegating this operation as appropriate to the coprocessor 34 if display textual information. Such writing can obviously only take place one image channel or overlay channel at a time, i.e., memory accesses via the buses 30 and 32 are only to one memory word at a time. Words may be read as well as written via the bus 32 since, as is well known, image creation may actually consist in modification of an existing image.

Figure 2:
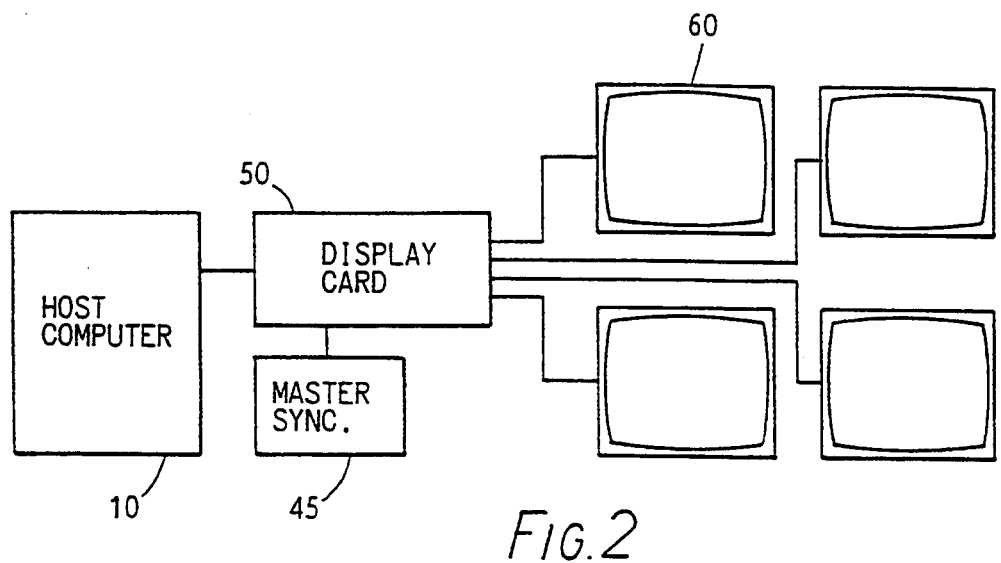
FIG. 2 is a block circuit diagram showing a four monitor graphics wall.

On the other hand the video drivers access the image SRAM's 22A to 22B in parallel and simultaneously access the overlay SRAM 22E so that each driver 24A–24D is supplied with an image byte plus overlay bits for every pixel. Each video driver displays for each pixel as follows:

On a basic system as shown in FIG. 2

(1) If the two bits from the overlay SRAM 22E are 00, whatever colour is determined by the look-up table as addressed by the 8-bit value supplied via the bus 44.

(2) if the two bits from the overlay SRMA 22E are 01, 10 or 11, a corresponding colour is displayed. The set of colours from which these three bit combinations select is determined by the two bits in the bus 40 which select the colour overlay set. These bits effect a kind of limited pallette selection for the overlay image which will consist of text or possibly text plus simple teletext-style graphics.

In FIG. 2, the display card 50 refers to the circuit shown in FIG. 1 without the host and associated keyboard, the co-processor and the master sync. generator. In FIG. 2 there are only four monitors making up the display.

In an expected system as shown in FIG. 3.

(1) If the four bits from the overlay SRMA 22E are 0000, the colour is determined by the 16-bit value supplied via the bus 44, which comprises 6 bits Green data, and 5 bits each of Red and Blue data.

(2) If the four bits from the overlay SRAM 22E are not 0000, a corresponding colour is displayed. The set of colours from which this is selected is determined by the two bits in the bus 40 which select the colour overlay set. These bits effect a kind of limited pallette selection for the overlay image which will consist of text or possibly test plus simply teletext-style graphics.

In FIG. 3, four display cards are shown, each driving four monitors, Additional blocks of 16 screens can be incorporated using the co-processor as shown.

From the foregoing description it will be appreciated that the resolution of the image being displayed is independent of the number of display units or monitors used. Whereas conventional systems are limited by the number of pixels making up the initial video image, the system described does not suffer from this limitation provided that there is adequate source data for display.

In order to synchronise boards in a multiple board system, a single sync generator 45 is provided, which drives all display address generators 46. The sync generator 46 serves all boards which each have their own address generator 46. This arrangement provides for the simultaneous display of channels and overlays on all monitors. The display address is time multiplexed with the computer/coprocessor address in the multiplexer 26. This also provides for the synchronisation between host and display operations. Since the speed of operation of the host is not known, this cannot be used as a reference. In system having a co-processor, the sync. generator is provided on the co-processor board with a locking arrangement to other systems. The system may then be locked to other video source in a more complex configuration.

The sync generator 45 controls the multiplexer 26 so that on one half of each clock cycle of this generator, the display address is passed to the decoder 28 from the address generator 46 whereas in the other clock cycle, the computer-generated address is passed to the decoder 28, with selection between the host 10 and coprocessor 34 as the source of this address by the bit on line 27. This time multiplexing takes place entirely independently of the host or coprocessor clocks (which are relatively slow) but the multiplexer 26 includes buffering capacity to hold addresses and data until transfers can actually take place, i.e. to effect speed buffering which is well known per se.

A single coprocessor 34 can serve all boards, since each board has its own address space; allowing for the transfer of information at a faster rate between boards, and, optionally, additional computers.

The main pallette for the image is handled conventionally by means not shown. A further slot of address space is used to access the lockup table for the pellette. Since the address range is shorter, the pallettes have multiple addresses in this slot. It is emphasised that all the technology on the driver side of the memory is state of the art and largely integrated on readily available driver chips. This address space, and the block unused in this embodiment could be used for additional storage and control of the system without the need for modification to existing computer host system.

In the embodiment described, the status register 36 is common to all channels and is moreover at the same address on all boards so all 24 channels are treated identically so far as the status register bits are concerned. Obviously, the six boards could have separately addressed status registers and, on any given board, there could be separately addressed status registers for each channel.

Regardless of such considerations, it will be appreciated that the number of images stored, how they are sequenced and whether and how the displayed information on the screws relates from screen to screen are all under control of the host computer, more especially via the status register or registers 36.

It will be appreciated that the embodiment described is particularly suited to displaying a series of pictures with overlay text when required. Such a system would be suitable when the display wall was to be used to display advertising, for example.

In particular, the image created is a static image which may be maintained without any degradation for as long as required. This is an advantage over video recorder/tape based systems which degrade the picture quality as the tape become damaged with repeated use.

In cases where the system is to be used for displaying departure times or similar passenger information the four channel memory segments 22A to 22D will be loaded with text, that is, with the appropriate selection of pixel colours the display will appear as text on a background. Naturally, the colour of both the text and the background can be chosen. In such an embodiment, the overlay text may still be retained to display additional text, for example message and the like. Alternatively the memory segment SRAM 22E may containing picture information. It will be appreciated that the system may be manipulated to display whatever is desired by the user and the invention is not limited to any particular arrangement of text and picture information in the SRAMs 22A to 22E.

The embodiment described has the advantage that the resolution of the image displayed on the display is independent of the number of display units. Thus, the resolution of a wall having 8×8 (i.e. 64) display units is no worse than that of a wall having 4×4 units. The system displays considerably more information than would be possible with conventional feeder splitters which could be used to distribute the signal. Typically a 4×4 display unit system would allow the display of H.D.T.V. (High Definition TeleVision) resolution using conventional display technology. An 8×8 display unit would display at the same resolution as a conventional poster of the same size.

The system described may be combined with existing video wall technology to create a combined video/graphics wall. In this way, images may be placed on sections of the wall while maintaining the graphics overlaying the entire wall. Such a system can obtain complex effects across the whole wall without requiring a video source for each display unit in the wall. This latter option has previously been put forward as a solution but is expensive and complex as it relies on complex synchronisation of a number of video tapes to achieve its results.

In a small system, for example a 2×2 wall, a video source may be displayed on one display unit while messages and other graphics are combined over the rest of the wall. The message may be read from close up. For example in a hotel reception, timetables, room allocation etc. may be displayed on one display unit while pictures of the hotel and other advertisements are displayed on the remaining units.

I claim:

1. A display system comprising a host computer having a computer bus connected to a status register and to one input of a multiplexer, a coprocessor being connected to another input of the multiplexer, a random access memory mapped into a plurality of memory slots addressable by the host computer and each corresponding to a channel for a respective screen, each channel including a screen driver connected to the memory and operative to provide a video signal to the corresponding screen, wherein the host computer is capable of writing image data into any selected one of the memory slots and the screen drivers read image data out of the memory slots in parallel to provide simultaneous video signals for display on corresponding screens, wherein the multiplexer is controlled from the status register to select which of the host computer and coprocessor accessed the memory, and wherein the resolution of each screen is independent of the number of screen comprising the display.

2. A display system according to claim 1, wherein the host computer and the screen drivers access the memory in time-multiplexed manner.

3. A display system according to claim 2, wherein the time multiplexing is controlled by a synchronising generator independently of the host computer clock cycle.

4. A display system according to claim 1, wherein each memory slot includes a plurality of image pages and wherein the host computer has a computer bus connected to a status register storing data determining which page is displayed via each image driver.

* * * * *